United States Patent Office 3,331,241
Patented July 18, 1967

3,331,241
PELLET TRANSPORT AND CRUSH STRENGTH TESTING APPARATUS
Bram B. Boonstra, Sharon, and Jaspard H. Atkins, Westwood, Mass., assignors to Cabot Corporation, Boston, Mass., a corporation of Delaware
Filed May 4, 1965, Ser. No. 452,984
4 Claims. (Cl. 73—94)

ABSTRACT OF THE DISCLOSURE

The present invention relates to a novel apparatus for testing the crush-strength of materials such as carbon black pellets, fertilizer granules and the like. Broadly, said apparatus comprises:

(1) A support strip having adhesive coated portions thereon, (2) Crush-strength testing means comprising a force-exerting means and force-measuring means, and (3) means to convey said support strip through said force-exerting means.

In operations the material to be tested is applied to the adhesive coated portions of said support strip whereon said material is held and conveyed through the crush-strength testing means.

---

In the chemical and plastic compounding arts it is often necessary to disperse agglomerated materials in mixing of kneading operations. These materials are generally agglomerated into pellets or granules for convenience in packing and shipping. However, often the materials are in such solidified form that they resist crushing and dispersion in the various steps. It has been found useful to measure the crush resistance of these pellets in order to predict the dispersion-forming characteristics thereof.

Besides testing for too-soft or too-hard pellets which can result in poor dispersions, the apparatus of the invention is useful in determining whether the pelletized material is so weakly cohesive that it is likely to result in excessive fines on packaging or on being subjected to the vibrational forces encountered in commercial transport.

Heretofore, a number of tests have been used in determining the crush strength of such pelletized materials. All these tests, however, had drawbacks. One such test, for example, depended upon an average value based on the testing of a mass of about two pounds of pellets. Of course, such a test would fail to show relatively small quantities of excessively soft or excessively hard agglomerates and the results of the test were not always in keeping with the actual dispersibility of the material being tested. Subsequent tests developed for the testing of individual particles proved extremely time consuming.

In large part these cumbersome and inconvenient testing techniques were dictated by the lack of convenient transport means for indivdual particles through a testing apparatus.

Therefore, it is an object of the invention to provide apparatus for conveniently and rapidly transporting particulate matter through a testing machine.

It is another object of the present invention to provide apparatus for rapidly and accurately determining the dispersibility of individual pellets of material.

It is still another object of the invention to provide apparatus which is adaptable for measuring properties of a wide variety of pellet sizes.

It is a further object of the invention to provide apparatus for measuring the crush strength of pelletized materials.

Other objects of the invention will become clear in view of the disclosure below.

Applicants have substantially met the objects of the invention mentioned above by providing an apparatus having a tape upon which individual pellets are serially passed through a testing device. The tape is provided, where advantageous, with a pellet attracting substance such as glue or other adhesive material. Pellets are fed onto this tape but selectively retained only on the portions of the sheet to which the aforesaid adhesive has been added. Furthermore, in a particularly useful embodiment of the invention wherein the crush strength of pelletized material is measured, the particle laden strip is carried between a pressure-exerting means and a force-measuring device. To protect the pressure-exerting means from being fouled by the material being crushed, a second tape is serially passed between the particles to be crushed and the pressure-exerting means. Thereupon both of the aforementioned tapes are fed through pull rolls which provide the means for drawing the tapes through the test apparatus.

In this application and accompanying drawings, we show and describe a preferred embodiment of our invention and suggest various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to requirements of a particular case.

Figure 1:
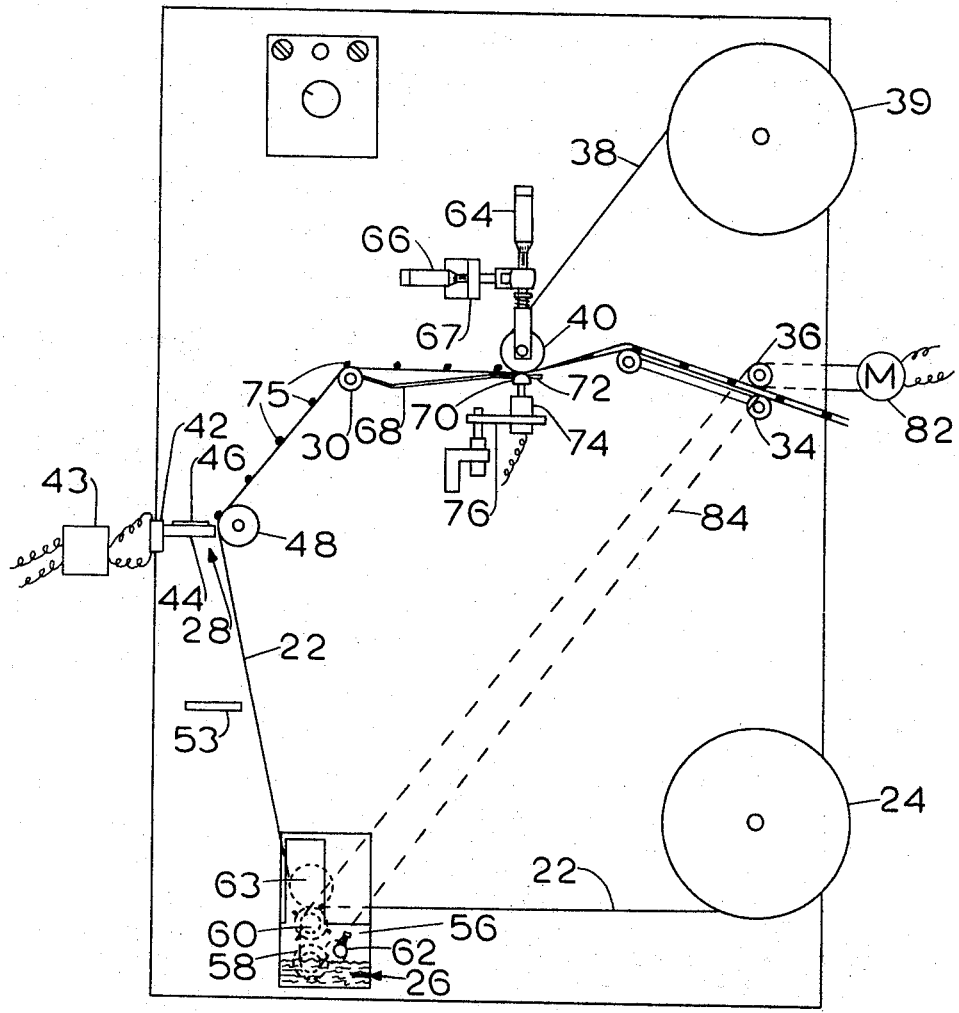
FIGURE 1 is a schematic elevation view of a crush strength test unit according to the invention.
Figure 3:
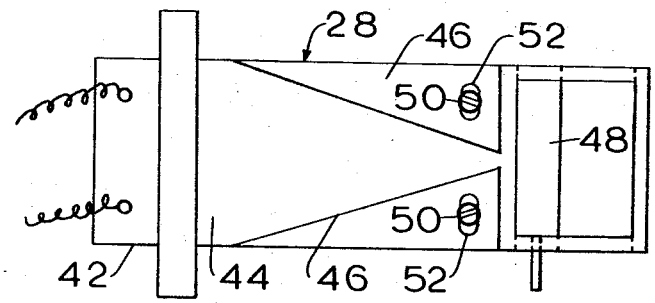
FIGURE 3 is a top view of said assembly.
Figure 2:
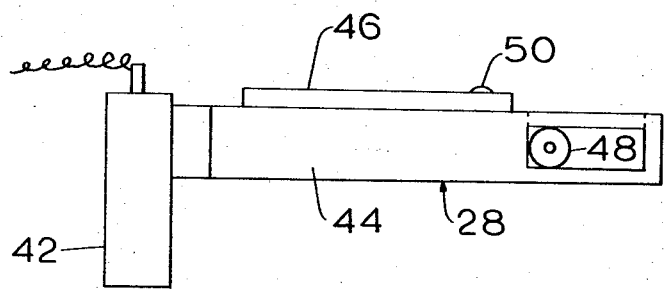
FIGURE 2 is a side elevation of a vibrator feed assembly.

Referring to FIGURE 1, it is seen that a polyester terephthalate tape 22 is stored on spool 24 and serially passed through glue applicator assembly 26, through pellet feed assembly 28, over pivot 30, and into a crush-strength test assembly; thereupon, tape 22 is carried through pull-rolls 34 and 36 and disposed of. Another polyester tape 38 is carried from spool 39 around crushing wheel 40 forming means to protect the wheel from contamination by glue and residue of crushed pellets.

Feed assembly 28 comprises a standard 8–12 volts A.C. vibrator 42 connected to a 110-volt source through a transformer 43 as is known in the art, a feed plate 44, feed guides 46 and tape back-up roller 48. Feed guides 46 are pivotally adjustable on screws 50. Furthermore, slots 52 (see FIGURE 4) in feed guides 46 provide additional means for adjusting the size of the feed outlet. Such adjustments are normally required to properly handle feeding of different pellet sizes. Such adjustments of feed guides 46 can easily be made by any skilled in the art to achieve proper feed conditions for any given pellet size. In operation a large excess of pellets is placed on feed plate 44; those that do not adhere to the glued spots on the tape will fall harmlessly into tray 53.

Glue applicator assembly 26 comprises a glue pot 56, a pick-up roll 58 partially submerged therein, a printing wheel 60 for transferring dots of glue from roll 58 to tape 22, and an eccentric cam wheel 62. The latter forms means to adjust the thickness of glue coating on roll 58 in accordance with the amount needed for holding a given pellet size. Roll 63 provides a firm backing for tape 22 as the glue is transferred thereto from printing wheel 60.

The crush-strength test assembly comprises crushing wheel 40 as a pressure-exerting means. Crush wheel 40 is laterally and vertically adjustable by means of vernier adjustors 64 and 66 mounted on supporting brace 67. The vertical adjustment is normally necessary when pellets of different vertical dimensions are to be tested for crush strength; the horizontal adjustment is then used to assure the crush wheel center is still in the proper vertical plane so that it tends to contact back-up platform 68 directly over foot 70.

Back-up platform 68 is anchored by means of free pivot 30. A flattened portion 72 of the back-up platform transmits the force exerted on a pellet by crushing wheel 40 to a polytetrafluoroethylene foot 70 operably connected to a transducer 74 held in bracket 76.

The apparatus is driven by motor 82 by means of roller chain 84 operably attached to sprocket wheels mounted adjacent aforementioned rolls 36 and 58 and wheel 60.

Transducer 74 is advantageously of excellent linearity characteristics and low hysteresis. On the crushing of pellets 75, the application of an axial force to the transducer drive rod connected to foot 70 causes the transducer core to be displaced a distance proportional to the force applied. The output voltage of the transformer is therefore directly proportional to the applied force. The core and drive assembly of the transducer is suspended at both ends by springs having excellent linearity and a high ratio of radial to axial stiffness. The internal parts of transducer 74 are not shown in the drawings, but the above description will allow those skilled in the transducer art to select an appropriate unit. One such unit is sold under the trade name FTA-1 Microforce Transducer by Sanborn Company.

The output signal of transducer 74 is recorded on a general-purpose galvanometer type recorder (not shown in drawings). In selecting this recording equipment, the critical time duration of the physical parameter being measured must be taken into consideration. For example, in determining the crush strength of carbon black pellets, the duration of the pellet fracture peak to be measured is of the order of 50 milliseconds. This is too brief for some potentiometric recorders to follow and it has been found advantageous to use a fast galvanometer type recorder, an oscilloscope, or the like. Recorders having a too-slow response will tend to give low crush strength values. A recorder sold under the trade designation model 301 by Sanborn Company has been found convenient for use in recording the crush strength of carbon black. This unit can be used to supply a 2.4 kilocycle excitation voltage to the transducer.

More sophisticated recorder equipment than that described above may be used in the apparatus. For example, a statistical digital voltmeter can be utilized to provide a printed histogram showing the distribution of pellet crush strengths for a given sample of pellets at a testing rate of 100 or more pellets per minute. Such equipment, however, is usually more expensive than the earlier-described recorder and is not necessary where mere identity of a number of very hard or very soft pellets in a tested sample is required.

Some of the more important variations from the apparatus specifically described are as follows:

In addition to the use of a tape-gluing procedure to impart pellet-holding positions to the tape, other means may be employed. For example, tapes coated with heat sensitive adhesives may be used instead of glued tapes. When this is done, the adhesive may be activated by application of heat thereto by means mounted within the test apparatus. Furthermore, magnetic and mechanical means may be advantageous for conveying and testing some agglomerates.

Other tapes than polyethylene terephthalate tapes may be used. However, care should be taken to assure the tape being used has no characteristic that interferes with the test being conducted. For example, a soft tape could provide an unwanted cushioning effect and interfere with the measurement of crush strength. Relatively thin and hard tapes are preferred.

In operating the crush-strength measuring apparatus of the invention, certain precautions are desirable in order to obtain optimum results. For example, the glue should not be a quick hardening material but should remain as a viscose liquid throughout its pot-life and until it has passed the crush-strength testing unit. Compositions formed of mineral oil and pyrogenic silica have been found suitable for use.

Furthermore, larger size pellets tend to give higher crush-strength values than smaller size pellets. For this reason, samples being tested are advantageously screened into size fractions before testing.

The vertical spacing, i.e. the distance between crushing wheel 40 and platform 68 must be carefully adjusted to assure optimum test dependability. The distance should be set so that all pellets of a sample are fractured but there is sufficient space for the fractured pellets to pass through the gap between crushing wheel and platform without producing a large secondary deflection in the recording. If the distance is too great, harder pellets will not be crushed. For pellets in the $-10 +18$ mesh size, a vertical setting of 0.3 mm. appears to be adequate. This can be checked visually by (1) observing the pellets as they are being measured, to make sure that no unfractured pellets pass through the test mechanism without being fractured and (2) observing the recorder to see that secondary peaks are set off from the fracture peaks and are not too high in magnitude.

The horizontal displacement of the crushing wheel is adjusted to have the pellets fractured directly above the transducer axial rod, thus eliminating any lever effects. However, lever action, unless gross in nature, has been largely neutralized by the construction of the present apparatus.

The motor drive unit may be chosen from many devices known to the art and operated at whatever speed is appropriate for the test being conducted.

Other variations in using the invention will be obvious to those skilled in the testing of materials. Transparent tapes, for example, may be used in measuring properties which are subject to optical testing means.

What is claimed is:

1. Apparatus for carrying out crush-strength determinations on pellets, said apparatus comprising:
   a support strip,
   a plurality of adhesive coated portions on said strip forming means for holding and carrying said pellets to be tested,
   a crush-strength testing means comprising a force-exerting means and a force-measuring means, and
   means for moving said support strip through said force-exerting means thereby bringing said pellets held by said adhesive coated portions of said support strip into serial register with said force-exerting means.

2. Apparatus for carrying out crush-strength determinations on pellets, said apparatus comprising:
   a support strip,
   a plurality of adhesive coated portions on said strip forming means for holding and carrying said pellets to be tested,
   a cover strip adapted to form a continuous cover over pellets held on said support strip,
   a crush-strength testing means comprising a force-exerting means and a force-measuring means, and
   means for moving said strips through said force-exerting means thereby bringing said pellets held by said adhesive coated portions of said support strip and covered by said cover strip into serial register with said force-exerting means.

3. Apparatus for carrying out crush-strength determinations on pellets, said apparatus comprising:
   a support strip,
   a plurality of heat responsive adhesive coated portions on said strip forming means for holding and carrying said pellets to be tested, a crush-strength testing means comprising a force-exerting means and a force-measuring means, and means for moving said support strip through said force-exerting means thereby bringing said pellets held by said heat responsive adhesive coated portions of said support strip into serial register with said force-exerting means.

4. Apparatus for carrying out crush-strength determinations on pellets, said apparatus comprising:
a support strip,
a plurality of adhesive coated portions on said strip forming means for holding and carrying said pellets to be tested,
a crush-strength testing means comprising (1) a force-exerting means and (2) a force-measuring means comprising a transducer responsive to force exerted on the drive rod thereof and a rapid responsive galvanometer-type recorder, and
means for moving said support strip through said force-exerting means thereby bringing said pellets held by said adhesive coated portions of said support strip into serial register with said force-exerting means.

References Cited
UNITED STATES PATENTS

| | | | |
|---|---|---|---|
| 2,029,922 | 2/1936 | Heckel et al. | 156—295 |
| 2,834,203 | 5/1958 | Sampson | 73—81 |
| 2,975,630 | 3/1961 | Michel | 73—94 |
| 2,978,101 | 4/1961 | Secunda | 209—73 |
| 3,237,764 | 3/1966 | Kochalski | 73—81 |

FOREIGN PATENTS 609,085 9/1960 Italy.

JAMES J. GILL, *Acting Primary Examiner.*

J. H. WILLIAMSON, *Assistant Examiner.*